United States Patent [19]
Gosa

[11] Patent Number: 6,158,571
[45] Date of Patent: Dec. 12, 2000

[54] FINGER BEARING ASSEMBLY FOR A COMBINE PLATFORM AUGER

[75] Inventor: Duane Junior Gosa, Colona, Ill.

[73] Assignee: Deere & Company, Moline, Ill.

[21] Appl. No.: 09/283,172

[22] Filed: Apr. 1, 1999

[51] Int. Cl.$^7$ ................................................ B65G 25/08
[52] U.S. Cl. ............................ 198/613; 198/693; 56/364
[58] Field of Search ................................... 198/613, 693; 15/364

[56] References Cited

U.S. PATENT DOCUMENTS

| | | | |
|---|---|---|---|
| 2,644,292 | 7/1953 | Oberholtz et al. | .......................... 56/364 |
| 2,803,505 | 8/1957 | Oberholtz . | |
| 3,348,706 | 10/1967 | Hyman . | |
| 4,271,956 | 6/1981 | Hutchinson et al. | .................... 198/613 |

Primary Examiner—Steven A. Bratlie

[57] ABSTRACT

A bearing and finger assembly for journaling on a crank shaft. The assembly includes two bearing halves, each having a bearing portion with a semi-cylindrical bearing surface such that the bearing halves may be mated to define a cylindrical bore for journaling on the crank shaft. The bearing halves are pivotally joined together to wrap around the crank shaft. Each bearing half includes a finger retaining portion extending radially from the bearing portion. The finger retaining portions define a socket for receiving the an end portion of the finger so that the finger extends generally radially with respect to the crank shaft. A sleeve surrounds the finger retaining portions to hold the bearing halves together about the crank shaft. The sleeve, the finger, and the finger retaining portions have transverse bores aligned with one another and receive a retaining pin that holds the sleeve on the bearing halves and the finger in the socket.

14 Claims, 2 Drawing Sheets

FINGER BEARING ASSEMBLY FOR A COMBINE PLATFORM AUGER

BACKGROUND OF THE INVENTION

1. Field of the Invention

This invention relates to a harvesting machine conveyor and in particular to a bearing assembly for a retractable finger in a conveying auger.

2. Description of Related Art

It is common in platforms for harvesters to assist the transfer of crop material into a feeder conveyor with a crop converging auger that contains spiral flighting to move crop material from the ends of the platform to the platform center to the feeder conveyor. The center portion of the auger immediately forward of the feeder conveyor is provided with a rotating and retracting finger arrangement in which a finger crank shaft is fixed inside of and eccentric to the rotating auger tube. Elongated fingers journaled on the finger crank shaft extend generally radially through guide slots in the surface of the tube so that as the tube rotates, the fingers are rotated about their shaft and reciprocated in the guide slots due to the eccentricity of the finger crank shaft with respect to the auger tube. The arrangement is timed so that the fingers extend to engage crop material and sweep it under the tube, into the feeder conveyor and retract to assist in releasing the material into the feeder conveyor.

A harvesting platform must operate in a variety of soil and crop conditions and is often operated at near maximum capacity so that its conveying elements, including the auger and fingers, are subjected to heavy and fluctuating loading, to abrasion from dirt gathered in with the crop, and possibly, to direct mechanical damage from inadvertent feeding of foreign bodies such as rocks and scrap metal into the conveyor system. There is thus a relatively frequent need to remove and reinstall platform auger fingers, to replace worn out finger bearings and /or broken fingers.

Access for disassembly and replacement of a bearing assembly and/or finger is gained through hand access holes in the auger tube, normally closed by removable covers. Since access into the auger tube is limited, replacing the fingers or finger bearings is awkward, inconvenient and often time consuming. A finger bearing assembly, as shown in U.S. Pat. No. 4,271,956, greatly simplified the process of replacing a finger bearing and/or finger as compared to the prior art at that time. The bearing assembly disclosed in that patent comprises two halves pivotally coupled or hinged together so that the two halves can be wrapped around the finger crank shaft and form a generally cylindrical bearing surface surrounding the crank shaft. The bearing halves include a radially extending finger retaining portion that, when the two halves are brought together around the crank shaft, provide a socket to receive the inner end of a finger. A bolt is passed through the radially extending finger retaining portions and through a bore near the inner end of the finger. The bolt is retained by a nut and secures the finger to the bearing assembly and also maintains the two bearing halves closed around the crank shaft. As such, it is necessary to use hand tools to secure the bearing assembly to the crank shaft and the finger to the bearing assembly.

SUMMARY OF THE INVENTION

Accordingly, it is an object of the invention to provide a simplified bearing and finger assembly that can be secured on the crank shaft without the use of hand tools.

The bearing and finger assembly of the invention comprises two bearing halves pivotally coupled or hinged so that securing the assembly on the shafts may be easily affected with a single clamping or securing device on a side of the bearing halves opposite from the hinged portion. A sleeve is placed over the finger retaining portions of the bearing halves to clamp the two bearing halves together. The finger retaining portions, when brought together provide a socket to receive the inner end of the finger. The finger, the sleeve and the finger retaining portions of the bearing halves each contain transverse bores that are aligned with one another. A single retaining pin is placed through the transverse bores. The sleeve serves to clamp the bearing halves together while the retaining pin holds the sleeve in place and holds the inner end of the finger in the socket formed by the finger retaining portions. The retaining pin is preferably a spring lock retainer that can be installed and removed by hand manipulation without the need for hand tools.

DESCRIPTION OF THE PREFERRED EMBODIMENT

Figure 1:
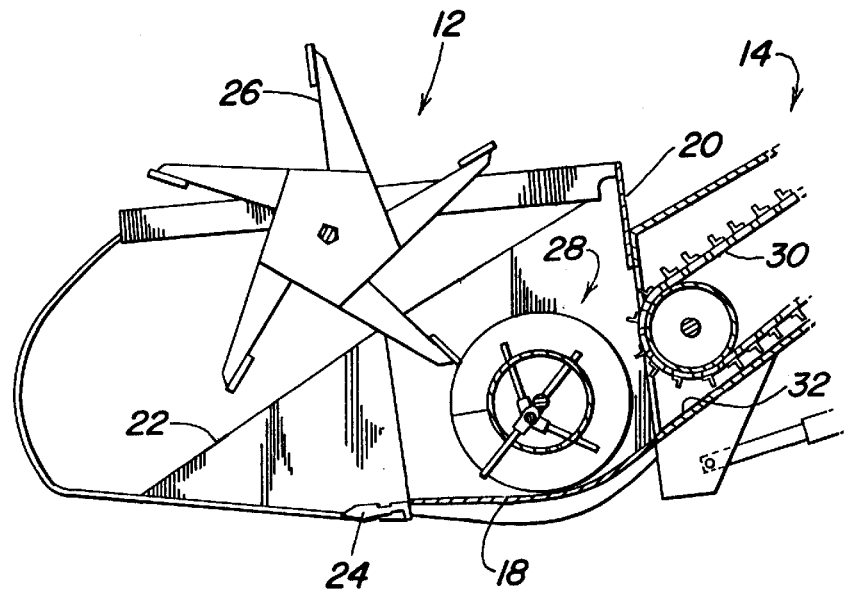
FIG. 1 is a semi-schematic side view of the platform and forward portion of a combine feederhouse, the platform including an auger embodying the invention.

The invention is embodied in the platform auger of the otherwise conventional grain cutting platform 12 of a combine shown in side elevation in FIG. 1. Platform 12 is mounted to a combine feederhouse 14. The platform 12 consists of a basic open front structure defined by a floor 18, a rear wall 20 and opposite side sheets 22. A cutterbar 24 extends forward from the floor to sever the standing crop. A reel 26 rotates above the cutterbar 24 to control the movement of crop material onto the cutterbar 24 and over the forward portion of the floor 18, into engagement with a platform auger 28.

The cutting platform 12 is much wider than the feederhouse 14 and the platform auger 28 converges or laterally transfers crop material from the cutterbar to the center of the platform. There the crop material is delivered to the feederhouse where it is engaged by the feederhouse conveyor 30 and moved rearwardly and upwardly over the feederhouse floor 32 for delivery to the combine threshing cylinder (not shown).

Figure 2:
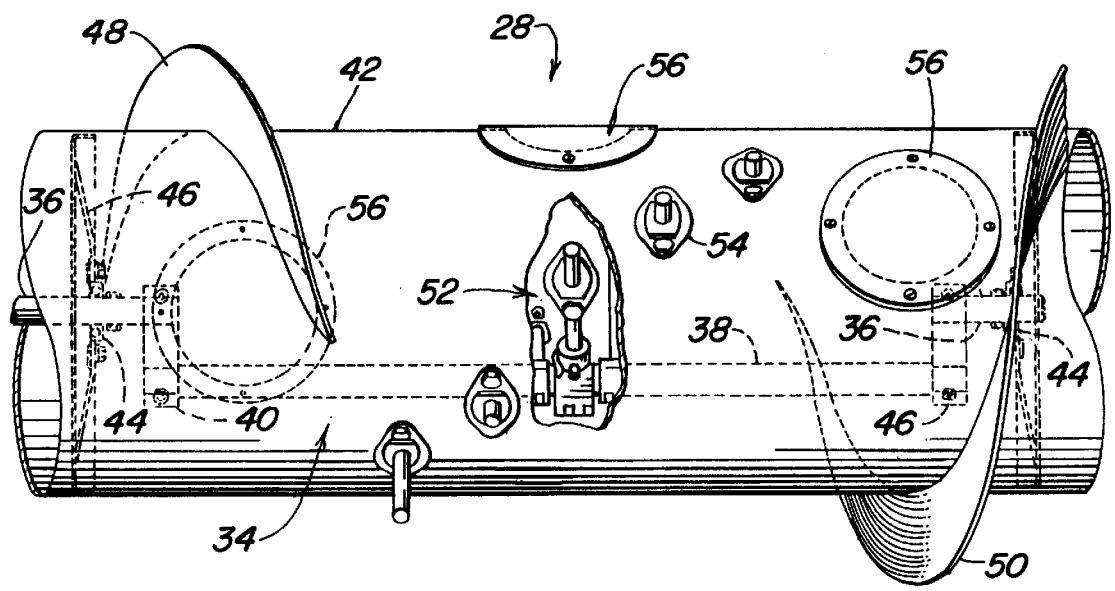
FIG. 2 is an enlarged, generally frontal elevation, partially cut away, illustrating the central portion of the platform auger and the general arrangement of the fingers.
Figure 3:
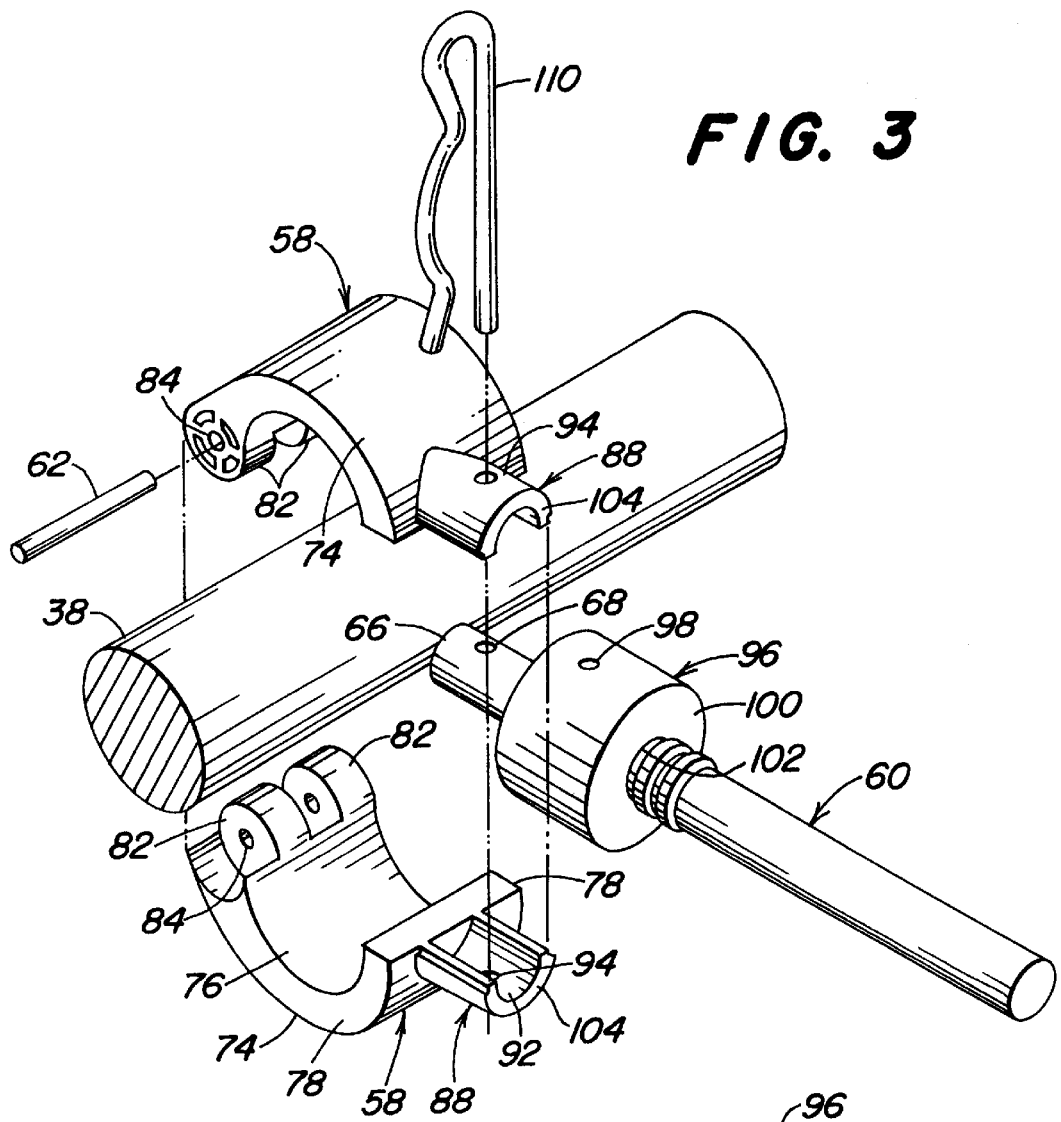
FIG. 3 is an exploded prospective view of a bearing and finger assembly.
Figure 4:
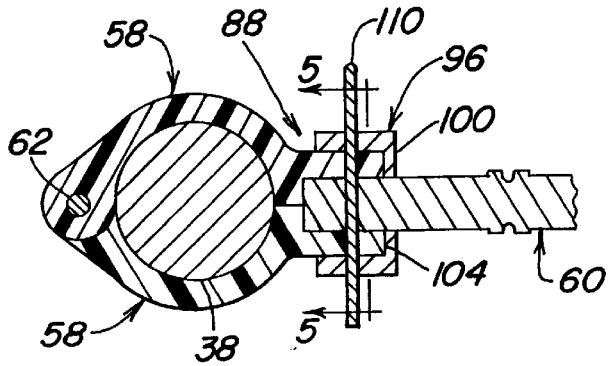
FIG. 4 is a sectional view of the assembled bearing and finger assembly.

The auger 28 is conventional in many respects and its general form in mounting is described only briefly herein. Such augers and their operation are well known. As indicated in FIG. 2, the platform auger 28 is supported by and journaled on a shaft assembly 34, including opposite coaxial auger shaft portions 36 and an offset or eccentric finger crank shaft portion 38 rigidly connected to the auger shaft portions 36 by a pair of cranks 40. The auger shaft portions 36 at the opposite ends of the auger 28 are mounted and secured against rotation in the side sheets 22 of the platform 12, as is conventional but not shown in the drawings.

The auger structure includes an elongated cylindrical tube 42, concentrically mounted and journaled on the auger shaft portions 36 by means of bearing assemblies 44 carrying spiders or bulk heads 46 rigidly attached to the inside of the auger tube 42. Helical auger flighting sections of opposite hand 48 and 50, respectively, cooperate with the platform floor 18 and rear wall 20 as the auger rotates to convey crop material to a central portion of the auger 28. There a plurality of bearing and finger assemblies 52 are joined on the finger crank shaft 38. Each bearing and finger assembly 52 extends through one of a plurality of guide assemblies 54 mounted in the wall of the auger tube 42. Removable covers 56 provide access to the inside of the auger tube 42, for example, for servicing the bearing and finger assemblies 52. Suitable conventional drive means, not shown, are provided for rotating the auger 28 on the shafts 36.

Each bearing and finger assembly 52 includes a pair of bearing halves 58, supporting an elongated finger 60. The two bearing halves 58 are secured together by a hinge pin 62. The finger 60 has a proximal end portion 66 with a transverse bore 68 therethrough whose axis is perpendicular to the longitudinal axis of the finger 60.

Each bearing half 58 consists of a central wall forming a bearing portion 74 having an internal semi-cylindrical bearing surface 76 and opposite parallel ends 78. At one side of the bearing portion 74, two hinge lugs 82 extend radially of the semi-cylindrical bearing surface 76. Hinge pin bores 84 in the lugs 82 are coaxial with each other and are parallel with the axis of the bearing surface 76. At the opposite side of the bearing portion 74 and extending radially of the semi-cylindrical bearing surface 76, is a finger retaining portion 88. The finger retaining portion 88 has a generally semi-cylindrical flange 92. A transverse bore 94 extends through each finger retaining portion 88. Each bearing half 58 is preferably made from a tough impact resistant material, able to provide a good bearing life without lubrication. One of the polyamides, such as Zytel ST 801 has been used successfully.

The offset of the hinge lugs 82 and the disposition of the hinge pin bores 84 is such that if two bearing halves 58 are brought together with the bearing surfaces 76 opposite and facing each other, the two halves will register so that the hinge pin 62 can be inserted in the bores 84, thus coupling the two halves 58 hingeably or rotatably together with the mating bearing surfaces 76 defining an approximately cylindrical bore. The mating bearing halves 58 are preferably identical to one another. Forms of coupling other than the hinge pin 62 may be used, but the respective halves preferably are pivotally coupled. It may be possible to mold the two bearing halves as a single component with a living hinge.

The hinged split bearing may then be opened, placed over and closed around the eccentric crank shaft 38. The finger retaining portion 88 of each bearing half 58 is symmetrical about a center line perpendicular to the axis of the bearing surface 76. When the bearing halves 58 are mated together, the finger retaining portions 88 form a cylindrical socket that receives the proximal end portion 66 of the finger 60. The transverse bore 68 in the finger is aligned with the transverse bores 94 in the finger retaining portions 88.

A cap or sleeve 96 slidable along the finger 60 is placed over the mating finger retaining portions 88 of the bearing halves 58. The sleeve 96 likewise has a transverse bore 98 that aligns with the transverse bores 94 in the finger retaining portions 88 and the transverse bore 68 in the finger 60. The sleeve 96 holds the two bearing halves together in a mating relation around the shaft 38. The sleeve 96 has an end wall 100 with a central aperture 102 to enable the sleeve to slide over the finger 60. As such, the sleeve is structured as a cap. The end wall 100 abuts the end 104 of the finger retaining portions 88 to fully seat the sleeve 96 onto the finger retaining portions with the transverse bores properly aligned. The sleeve 96 can be made without the end wall 100. The sleeve may be configured to engage the bearing portion 74 of the bearing halves 58 to be fully seated with the transverse bores properly aligned. The sleeve 96 is made of a die cast alloy material. Alternatively, the sleeve 96 may be molded of the same resin as the bearing halves 58.

Figure 5:
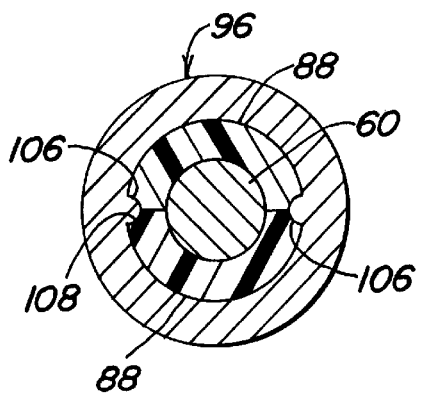
FIG. 5 is a sectional view as seen from substantially the line 5—5 of FIG. 4 illustrating the grooves and ridges for indexing the sleeve.

The finger retaining portions 88 define indexing grooves 106 when mated as shown in FIG. 5. The sleeve 96 in turn has mating ridges 108 which seat into the grooves 106 to rotational orient the sleeve 96 on the finger retaining portions 88. This assures proper alignment of the bore 98 of the sleeve with the bores 94 in the finger retaining portions 88. While two grooves 106 and ridges 108 are shown, it will be appreciated that only one groove and ridge will suffice for indexing the sleeve. The finger 60 is not indexed within the cylindrical socket of the finger retaining portions 88. The finger 60 must be rotated within the socket to align the finger bore 68 with the bores 94. If desired, the finger 60 and the finger retaining portions 88 can have indexing features. For example, the finger can be formed with a square end and the socket formed complementary, as shown in the above mentioned patent, to assist in aligning the bores.

A retaining pin 110 is inserted through the bore 98 in sleeve 96, the bores 94 in the finger retaining portions 88 and the bore 68 in the finger 60. The retaining pin 110 serves two purposes, the first of which is to retain the sleeve 96 in place on the finger retaining portions 88 to hold the bearing halves 58 in place about the eccentric crank shaft 38. The second purpose for the retaining pin 110 is to hold the finger 60 attached to the finger retaining portions 88. Preferably, the pin 110 is a spring locking pin that can be inserted through the bores by hand and removed by hand without the need for hand tools. Thus, the finger 60 and/or the bearing halves 58 can be replaced by hand without the need to manipulate hand tools within the auger tube 42.

Bearing and finger assemblies configured differently than that shown and described above can be utilized to carry out the present invention. As such, the invention should not be limited to the above-described embodiment, but should be limited solely to the claims that follow.

What is claimed is:

1. A bearing and finger assembly for journaling on a crank shaft comprising:

an elongated finger having a proximal end portion with a transverse bore therethrough;

first and second bearing halves, each half having:

a bearing portion including an inner semi-cylindrical bearing surface such that the first and second halves may be mated to define a cylindrical bore for journaling on the crank shaft; and a finger retaining portion extending from the bearing portion in a direction generally radial to the cylindrical bore, the finger retaining portions defining a socket for receiving the proximal end portion of the finger so that the finger extends generally radial to the cylindrical bore when the first and second halves are mated, the finger retaining portions having a transverse bore aligned with the transverse bore in the finger when the end portion of the finger is received in the socket;

a sleeve surrounding the finger retaining portions to hold the bearing halves together about the crank shaft, the sleeve having a transverse bore aligned with the transverse bores in the finger and the finger retaining portions of the bearing halves; and a retaining pin extending through the transverse bores in the sleeve, the finger retaining portions of the bearing halves and the finger to retain the sleeve on the finger retaining portions and to retain the end portion of the finger in the socket.

2. The bearing and finger assembly as defined in claim 1 wherein the retaining pin is removable by hand manipulation without the use of tools.

3. The bearing and finger assembly as defined in claim 1 wherein the retaining pin is a spring locking pin.

4. The bearing and finger assembly as defined in claim 1 wherein the socket formed by the finger retaining portion is cylindrical and the finger end portion is cylindrical.

5. The bearing and finger assembly as defined in claim 1 wherein the finger retaining portions of the bearing halves and the sleeve have complementary engaging elements to rotationally position the sleeve on the finger retaining portions with the transverse bore of the sleeve aligned with the transverse bore of the finger retaining portions.

6. The bearing and finger assembly as defined in claim 5 wherein the complementary engaging elements include a groove defined by the finger retaining portions on the exterior thereof and a ridge on the interior of the sleeve engagable with the groove.

7. The bearing and finger assembly as defined in claim 1 wherein the sleeve has an end wall having an aperture therein and the end wall engages the finger retaining portion of the bearing halves when fully seated thereon with the transverse bore of the sleeve aligned with the transverse bore of the finger retaining portion.

8. The bearing and finger assembly as defined in claim 1 wherein the bearing halves are substantially identical.

9. A bearing assembly for journaling on a crank shaft comprising first and second bearing halves, each bearing half having a bearing portion including an inner semi-cylindrical bearing surface such that the first and second halves may be mated to define a cylindrical bore for journaling on the crank shaft, the first and second halves being joined to one another at one side of the bearing portion to be placed over the crank shaft and mated to surround the crank shaft, a finger retaining portion extending from an opposite side of the bearing portion in a direction generally radial to the cylindrical bore, the finger retaining portions defining a socket for receiving a proximal end of a finger so that the finger extends generally radial to the cylindrical bore when the first and second bearing halves are mated, the finger retaining portions having a transverse bore therethrough, and a sleeve surrounding the finger retaining portions to hold the bearing halves together about the crank shaft, the sleeve having a transverse bore aligned with the transverse bore in the finger retaining portions of the bearing halves.

10. The bearing assembly as defined in claim 9 wherein the socket formed by the finger retaining portion is cylindrical for reception of a cylindrical finger end portion therein.

11. The bearing assembly as defined in claim 9 wherein the finger retaining portions of the bearing halves and the sleeve have complementary engaging elements to rotationally position the sleeve on the finger retaining portions with the transverse bore of the sleeve aligned with the transverse bore of the finger retaining portions.

12. The bearing assembly as defined in claim 11 wherein the complementary engaging elements include a groove defined by the finger retaining portions on the exterior thereof and a ridge on the interior of the sleeve engagable with the groove.

13. The bearing assembly as defined in claim 9 wherein the sleeve has an end wall having an aperture therein and the end wall engages the finger retaining portion of the bearing halves when fully seated thereon with the transverse bore of the sleeve aligned with the transverse bore of the finger retaining portion.

14. The bearing and finger assembly as defined in claim 9 wherein the bearing halves are substantially identical.

* * * * *